United States Patent
Zhang

(10) Patent No.: US 12,088,817 B2
(45) Date of Patent: Sep. 10, 2024

(54) DATA CODING METHOD AND APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventor: Qing Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 124 days.

(21) Appl. No.: 17/947,443

(22) Filed: Sep. 19, 2022

(65) Prior Publication Data

US 2023/0018087 A1  Jan. 19, 2023

Related U.S. Application Data

(63) Continuation of application No. PCT/CN2021/129987, filed on Nov. 11, 2021.

(30) Foreign Application Priority Data

Nov. 13, 2020 (CN) .......................... 202011264969.1

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/172* (2014.11); *H04N 19/176* (2014.11)

(58) Field of Classification Search
CPC .. H04N 19/105; H04N 19/137; H04N 19/172; H04N 19/176; H04N 1/00;
(Continued)

(56) References Cited

U.S. PATENT DOCUMENTS

| 6,418,166 B1 * | 7/2002 | Wu ...................... H04N 19/567 |
| | | 375/240.12 |
| 10,313,692 B2 * | 6/2019 | Liu ...................... H04N 19/167 |

(Continued)

FOREIGN PATENT DOCUMENTS

| CN | 101374235 A | 2/2009 |
| CN | 101378504 A | 3/2009 |

(Continued)

OTHER PUBLICATIONS

Nie et al.; Adaptive Rood Pattern Search for Fast Block-Matching Motion Estimation, Dec. 2002; IEEE Transactions on Image Processing, vol. 11, No. 12 pp. 1-8.*

(Continued)

*Primary Examiner* — Peter D Le
(74) *Attorney, Agent, or Firm* — Crowell & Moring LLP

(57) ABSTRACT

This application discloses a data coding method and apparatus, and a computer-readable storage medium. The method involves a data transmission related technology in a cloud technology, and includes: acquiring at least two coding units in an image frame in video data, acquiring motion vector information of each coding unit of the at least two coding units, determining overall average vector information of the image frame based on the motion vector information of each coding unit, determining component average vector information of the image frame in a reference direction based on component vector information of the motion vector information of each coding unit in the reference direction, determining a frame execution policy of the image frame for a motion search operation in the reference direction according to the overall average vector information and the component average vector information, and encoding the image frame according to the determined frame execution policy.

17 Claims, 10 Drawing Sheets

(51) Int. Cl.
*H04N 19/172* (2014.01)
*H04N 19/176* (2014.01)

(58) Field of Classification Search
CPC .. H04N 3/00; H04N 7/00; H04N 5/00; H04N 9/00; H04N 11/00; H04N 19/00; H04N 21/00
See application file for complete search history.

(56) References Cited

U.S. PATENT DOCUMENTS

| | | | | |
|---|---|---|---|---|
| 2001/0021272 | A1* | 9/2001 | Yamori | H04N 19/51 382/107 |
| 2003/0215015 | A1* | 11/2003 | Ohira | H04N 19/57 375/E7.122 |
| 2004/0247029 | A1* | 12/2004 | Zhong | H04N 19/56 375/E7.113 |
| 2005/0249426 | A1* | 11/2005 | Badawy | H04N 19/597 382/241 |
| 2005/0265454 | A1* | 12/2005 | Muthukrishnan | H04N 19/53 348/E5.066 |
| 2006/0188019 | A1* | 8/2006 | Lin | H04N 19/139 375/E7.181 |
| 2015/0222932 | A1* | 8/2015 | Liao | H04N 17/004 375/240.27 |
| 2020/0007889 | A1 | 1/2020 | Chao et al. | |

FOREIGN PATENT DOCUMENTS

| | | |
|---|---|---|
| CN | 101511019 A | 8/2009 |
| CN | 102685495 A | 9/2012 |
| CN | 108737837 A | 11/2018 |
| CN | 112104871 A | 12/2020 |
| JP | 2017204752 A | 11/2017 |

OTHER PUBLICATIONS

International Search Report and Written Opinion with English translation regarding PCT/CN2021/129987 dated Feb. 7, 2022, 9 pages.

Chinese Office Action with English concise explanation of relevance regarding 202011264969.1 dated Dec. 30, 2020, 6 pages.

* cited by examiner

DATA CODING METHOD AND APPARATUS, AND COMPUTER-READABLE STORAGE MEDIUM

RELATED APPLICATION

This application is a continuation application of PCT Patent Application No. PCT/CN2021/129987, filed on Nov. 11, 2021, which claims priority to Chinese Patent Application No. 202011264969.1, filed with the China National Intellectual Property Administration, PRC on Nov. 13, 2020, both of which are incorporated herein by reference in their entireties.

FIELD OF THE TECHNOLOGY

This application relates to the technical field of data processing, and particularly to a data coding method and apparatus, and a computer-readable storage medium.

BACKGROUND OF THE DISCLOSURE

Many daily life scenarios involve compression of video data. For example, when user A transmits a piece of video data to user B, a process of compressing and then transmitting the video data is involved. When video data is compressed, motion vector information of each image frame in the video data is used. The motion vector information may represent a relative change between adjacent image frames of the video data.

SUMMARY

Embodiments of this application provide an image processing method and apparatus and a related device for encoding video data, increasing the encoding and/or decoding speed for the image frame, and/or further increasing the encoding/decoding speed for the video data, and/or improving the performance of video coding/decoding.

The present disclosure describes a method for encoding video data. The method includes acquiring, by a device, at least two coding units in an image frame in video data. The device includes a memory storing instructions and a processor in communication with the memory. The method also includes acquiring, by the device, motion vector information of each coding unit of the at least two coding units; determining, by the device, overall average vector information of the image frame based on the motion vector information of each coding unit; determining, by the device, component average vector information of the image frame in a reference direction based on component vector information of the motion vector information of each coding unit in the reference direction; determining, by the device, a frame execution policy of the image frame for a motion search operation in the reference direction according to the overall average vector information and the component average vector information, wherein the frame execution policy indicating a frame enable execution policy or a frame disable execution policy; and encoding, by the device, the image frame according to the determined frame execution policy.

The present disclosure describes an apparatus for encoding video data. The apparatus includes a memory storing instructions; and a processor in communication with the memory. When the processor executes the instructions, the processor is configured to cause the apparatus to perform: acquiring at least two coding units in an image frame in video data, acquiring motion vector information of each coding unit of the at least two coding units, determining overall average vector information of the image frame based on the motion vector information of each coding unit, determining component average vector information of the image frame in a reference direction based on component vector information of the motion vector information of each coding unit in the reference direction, determining a frame execution policy of the image frame for a motion search operation in the reference direction according to the overall average vector information and the component average vector information, wherein the frame execution policy indicating a frame enable execution policy or a frame disable execution policy, and encoding the image frame according to the determined frame execution policy.

The present disclosure describes a non-transitory computer-readable storage medium, storing computer-readable instructions. The computer-readable instructions, when executed by a processor, are configured to cause the processor to perform: acquiring at least two coding units in an image frame in video data; acquiring motion vector information of each coding unit of the at least two coding units; determining overall average vector information of the image frame based on the motion vector information of each coding unit; determining component average vector information of the image frame in a reference direction based on component vector information of the motion vector information of each coding unit in the reference direction; determining a frame execution policy of the image frame for a motion search operation in the reference direction according to the overall average vector information and the component average vector information, wherein the frame execution policy indicating a frame enable execution policy or a frame disable execution policy; and encoding the image frame according to the determined frame execution policy.

The present disclosure also provides a data coding method, including:
  acquiring at least two coding units in a target image frame, and acquiring motion vector information of each of the at least two coding units;
  determining overall average vector information of the target image frame based on the motion vector information of each coding unit;
  determining component average vector information of the target image frame in a reference direction based on component vector information of the motion vector information of each coding unit in the reference direction; and
  determining a frame execution policy of the target image frame for a motion search operation in the reference direction according to the overall average vector information and the component average vector information, the frame execution policy being a frame enable execution policy or a frame disable execution policy.

An aspect of this application provides a data coding apparatus, including:
  a motion information acquisition module, configured to acquire at least two coding units in a target image frame, and acquire motion vector information of each of the at least two coding units;
  an overall information determination module, configured to determine overall average vector information of the target image frame based on the motion vector information of each coding unit;
  a component information determination module, configured to determine component average vector information of the target image frame in a reference direction based on component vector information of the motion vector information of each coding unit in the reference direction; and a policy determination module, configured to determine a frame execution policy of the target image frame for a motion search operation correlated with the reference direction according to the overall average vector information and the component average vector information, the frame execution policy being a frame enable execution policy or a frame disable execution policy.

An aspect of this application provides a computer device, including a memory and a processor, the memory storing a computer program, the computer program, when executed by the processor, causing the processor to perform the method according to the foregoing aspect.

An aspect of this application provides a computer-readable storage medium storing a computer program, the computer program including program instructions, the program instructions, when executed by a processor, causing the processor to perform the method according to the foregoing aspect.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the optional implementations of the foregoing aspect.

BRIEF DESCRIPTION OF THE DRAWINGS

To describe the technical solutions in this application or the related art more clearly, the following briefly describes the accompanying drawings required for describing the embodiments or the related art. Apparently, the accompanying drawings in the following description show only some embodiments of this application, and a person of ordinary skill in the art may derive other drawings from the accompanying drawings without creative efforts.

DESCRIPTION OF EMBODIMENTS

The technical solutions in this application are clearly and completely described below with reference to the accompanying drawings in this application. Apparently, the described embodiments are merely some rather than all of the embodiments of this application. All other embodiments obtained by a person of ordinary skill in the art based on the embodiments of this application without creative efforts shall fall within the protection scope of this application.

This application relates to a cloud technology. The cloud technology refers to a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources, such as a video website, an image website, and more portal websites. A background service of a technical network system requires a large amount of computing and storage resources, such as a video website, an image website, and more portal websites.

The cloud technology mainly involved in this application refers to a technology of transmitting video data, and a technology capable of performing coding compression and then transmission on video data by use of a cloud server is specifically involved. References are made to the following content descriptions.

In the related art, when video data is compressed, a rood-pattern search algorithm is executed on each image frame in the video data. Executing the rood-pattern search algorithm on the image frame may find a motion direction in motion vector information of the image frame. It is usually time-consuming to execute the rood-pattern search algorithm on each image frame, so executing the rood-pattern search algorithm on each image frame in the video data may lead to relatively high time consumption in coding of the image frame and further relatively high time consumption in coding of the video data.

This application provides a data coding method. According to the method provided in this application, when there is no apparent motion in a horizontal direction or a vertical direction in a certain image frame, a rood-pattern search algorithm-based operation may not be executed on this image frame. Therefore, the coding speed for the image frame may be increased, and the coding speed for the video data may further be increased.

Figure 1:
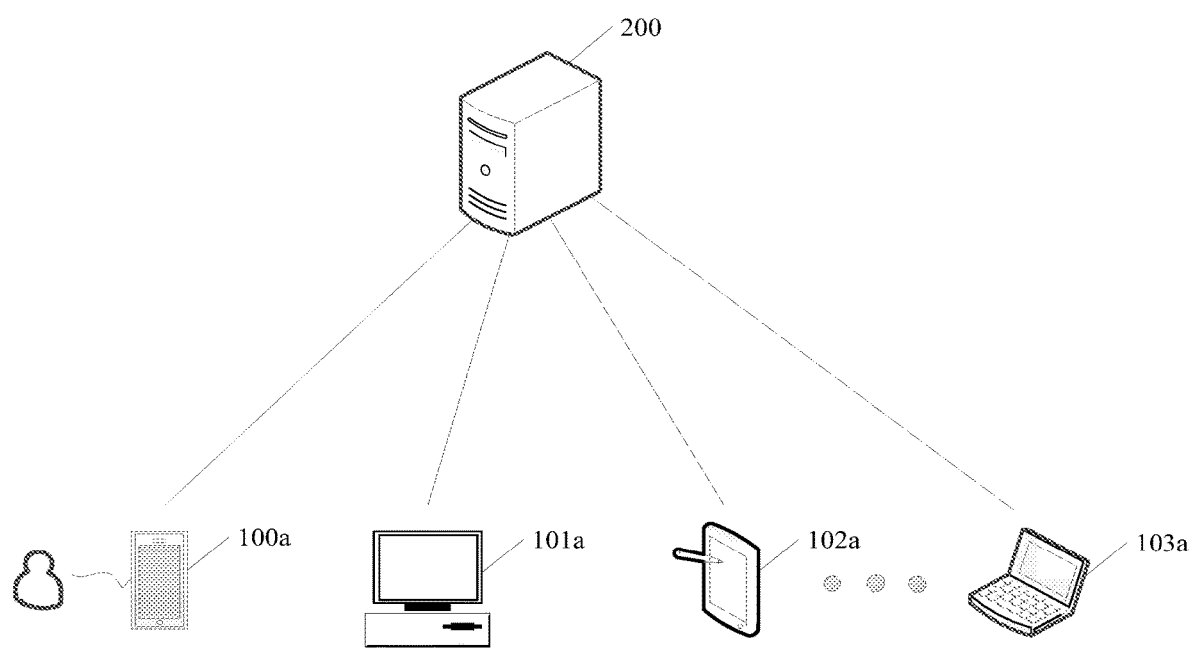
FIG. 1 is a schematic structural diagram of a network architecture according to an embodiment of this application.

Referring to FIG. 1, FIG. 1 is a schematic structural diagram of a network architecture according to an embodiment of this application. As shown in FIG. 1, the network architecture may include a server 200 and a terminal device cluster. The terminal device cluster may include one or more terminal devices. The number of the terminal devices is not limited herein. As shown in FIG. 1, multiple terminal devices may specifically include a terminal device 100a, a terminal device 101a, a terminal device 102a, . . . , and a terminal device 103a. As shown in FIG. 1, each of the terminal device 100a, the terminal device 101a, the terminal device 102a, . . . , and the terminal device 103a may establish a network connection with the server 200 so as to perform data interaction with the server 200 through the network connection.

The server 200 shown in FIG. 1 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be: an intelligent terminal, such as a smartphone, a tablet computer, a notebook computer, a desktop computer, and a smart television. The embodiment of this application will now be specifically described taking communication between the terminal device 100a and the server 200 as an example.

Figure 2:
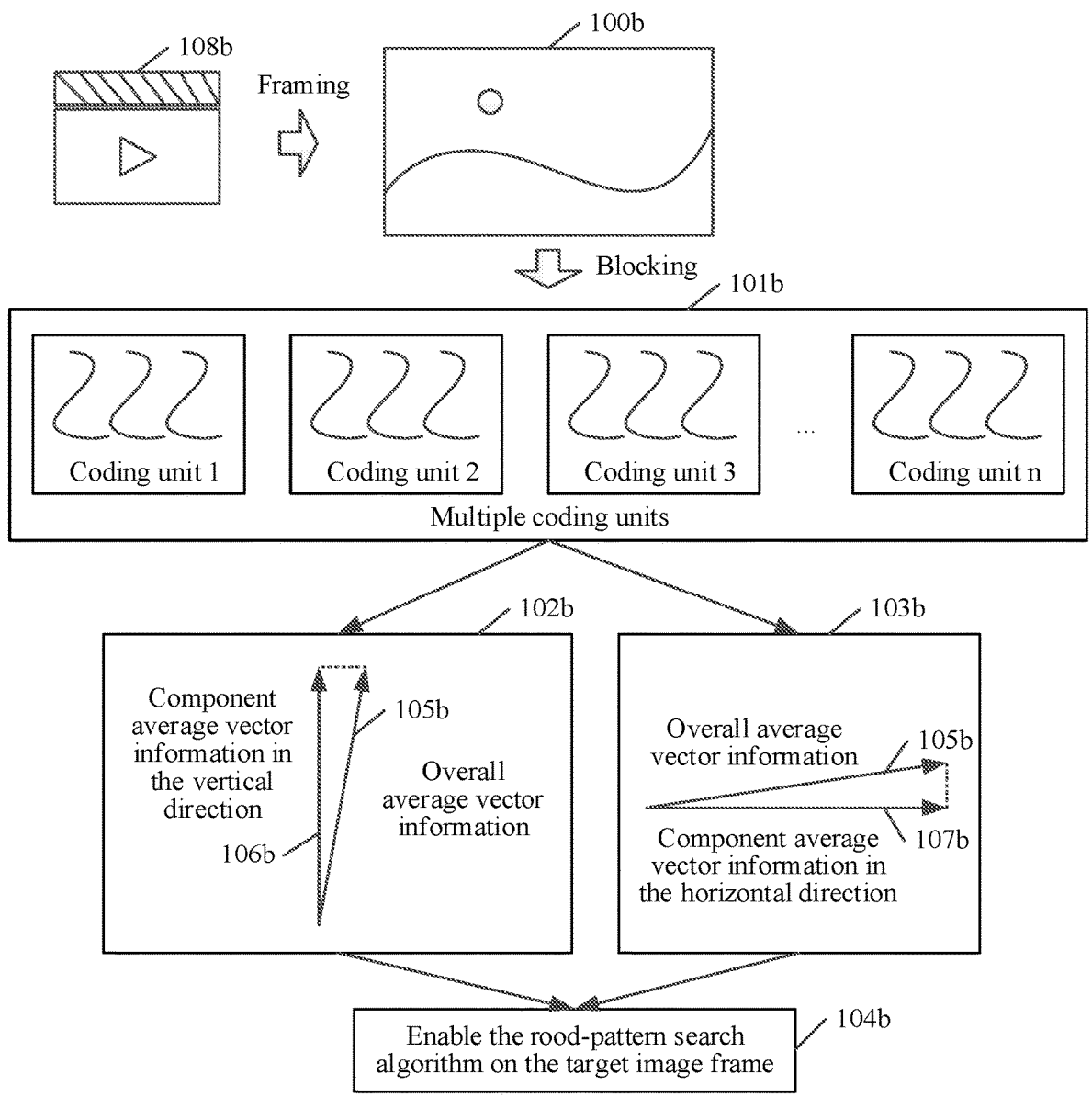
FIG. 2 is a schematic scenario diagram of data coding according to this application.

Referring to FIG. 2 together, FIG. 2 is a schematic scenario diagram of data coding according to this application. An image frame 100b is an image frame obtained by framing video data 108b. That is, the image frame 100b may be any image frame in the video data 108b. The video data 108b may be any piece of video data. The video data 108b is acquired by the terminal device 100a. For example, the video data 108b may be conference video data recorded by the terminal device 100a in a real-time online conference. The terminal device 100a, after acquiring the video data 108b, may send the video data 108b to the server 200 so as to request the server 200 to code the video data 108b. Therefore, the server 200, after acquiring the video data 108b, may frame the video data 108b to obtain the image frame 100b.

The server 200 codes each image frame in the video data 108b based on the same principle. Therefore, descriptions are made herein taking coding of the image frame 100b by the server 200 as an example.

As shown in FIG. 2, the server 200 may divide the image frame 100b into multiple (at least two) coding units. Here, the multiple coding units of the image frame 100b divided by the server 200 may include n coding units in a region 101b. A value of n may be determined according to a practical application scenario, and no limits are made thereto. The n coding units may specifically include: a coding unit 1, a coding unit 2, a coding unit 3, . . . , and a coding unit n.

Each of the n coding units has corresponding motion vector information. The motion vector information may represent a change (i.e., motion condition) of the coding unit in the image frame 100b relative to a coding unit at a corresponding position in a previous image frame of the image frame 100b in the video data 108b. The motion vector information may be used for coding the image frame 100b.

The server 200 may calculate overall average vector information 105b of the image frame 100b based on the motion vector information respectively corresponding to the n coding units in the image frame 100b. The overall average vector information 105b represents an average value of motion vector information corresponding to all the coding units in the image frame 100b. A specific process of calculating the overall average vector information 105b may refer to corresponding descriptions in the following embodiment corresponding to FIG. 3.

The server 200 may also calculate component average vector information 106b of the image frame 100b in a vertical direction (which can be understood as a y-axis direction) based on the motion vector information respectively corresponding to the n coding units in the image frame 100b. The component average vector information 106b represents an average value of the motion vector information corresponding to all the coding units in the image frame 100b in the vertical direction. A specific process of calculating the component average vector information 106b may also refer to corresponding descriptions in the following embodiment corresponding to FIG. 3.

The server 200 may also calculate component average vector information 107b of the image frame 100b in a horizontal direction (which can be understood as an x-axis direction) based on the motion vector information respectively corresponding to the n coding units in the image frame 100b. The component average vector information 107b represents an average value of the motion vector information corresponding to all the coding units in the image frame 100b in the horizontal direction. A specific process of calculating the component average vector information 107b may also refer to corresponding descriptions in the following embodiment corresponding to FIG. 3.

When there is a condition described in region 102b or a condition described in region 103b for the overall average vector information 105b, the component average vector information 106b in the vertical direction, and the component average vector information 107b in the horizontal direction, the server, when coding the image frame 100b, may enable (namely execute) a rood-pattern search algorithm on the image frame 100b (namely reaching a conclusion in region 104b). Under other conditions, i.e., conditions except the condition described in region 102b and the condition described in region 103b, the server may disable (skip executing) the rood-pattern search algorithm on the image frame 100b.

The rood-pattern search algorithm is an algorithm used by the server to search for a motion direction of the motion vector information in the image frame 100b when coding the image frame 100b. It can be understood that the coding speed for the image frame 100b when the rood-pattern search algorithm is executed on the image frame 100b is lower than that for the image frame 100b when the rood-pattern search algorithm is not executed (namely disabled) on the image frame 100b. Therefore, determining to disable the rood-pattern search algorithm for the image frame 100b under some conditions (i.e., conditions except the condition described in region 102b and the condition described in region 103b) based on the overall average vector information 105b, the component average vector information 106b in the vertical direction, and the component average vector information 107b in the horizontal direction may increase the coding speed for the image frame 100b.

The condition described in region 102b is that: when a ratio of the component average vector information 106b of the image frame 100b in the vertical direction to the overall average vector information 105b is greater than a certain ratio threshold, the rood-pattern search algorithm may be enabled for the image frame 100b. When the ratio of the component average vector information 106b to the overall average vector information 105b is greater than a certain ratio threshold (which is configurable), it indicates that there is an apparent motion in the vertical direction in the image frame 100b relative to the previous image frame.

The condition described in region 103b is that: when a ratio of the component average vector information 107b of the image frame 100b in the horizontal direction to the overall average vector information 105b is greater than a certain ratio threshold (which is configurable), the rood-pattern search algorithm may be enabled for the image frame 100b. When the ratio of the component average vector information 107b to the overall average vector information 105b is greater than a certain ratio threshold, it indicates that there is an apparent motion in the horizontal direction in the image frame 100b relative to the previous image frame.

The server 200 may code the video data 108b based on the reached conclusion about whether it is necessary to execute the rood-pattern search algorithm on the image frame 100b to obtain coded data of the video data 108b. The server 200 may transmit the coded data to a video client that needs to play the video data 108b. The video client, after acquiring the coded data, may decode the coded data to obtain decoded data of the video data 108b. The video client may play the decoded data, so as to implement playing of the video data 108b.

In some implementations, when the component average vector information 106b of the image frame 100b in the vertical direction is greater than a vertical-vector threshold, it indicates that there is an apparent motion in the vertical direction in the image frame 100b relative to the previous image frame, and thus the rood-pattern search algorithm may be enabled for the image frame 100b. The vertical-vector threshold is configurable.

In some implementations, when the component average vector information 107b of the image frame 100b in the horizontal direction is greater than a horizontal-vector threshold, it indicates that there is an apparent motion in the horizontal direction in the image frame 100b relative to the previous image frame, and thus the rood-pattern search algorithm may be enabled for the image frame 100b. The horizontal-vector threshold is configurable.

According to the method provided in this application, when there is an apparent motion in the horizontal direction or the vertical direction in a certain image frame (such as the image frame 100b), namely there is an apparent horizontal motion or vertical motion, the rood-pattern search algorithm may be enabled for this image frame. Therefore, the coding speed for the image frame may be increased.

Figure 3:
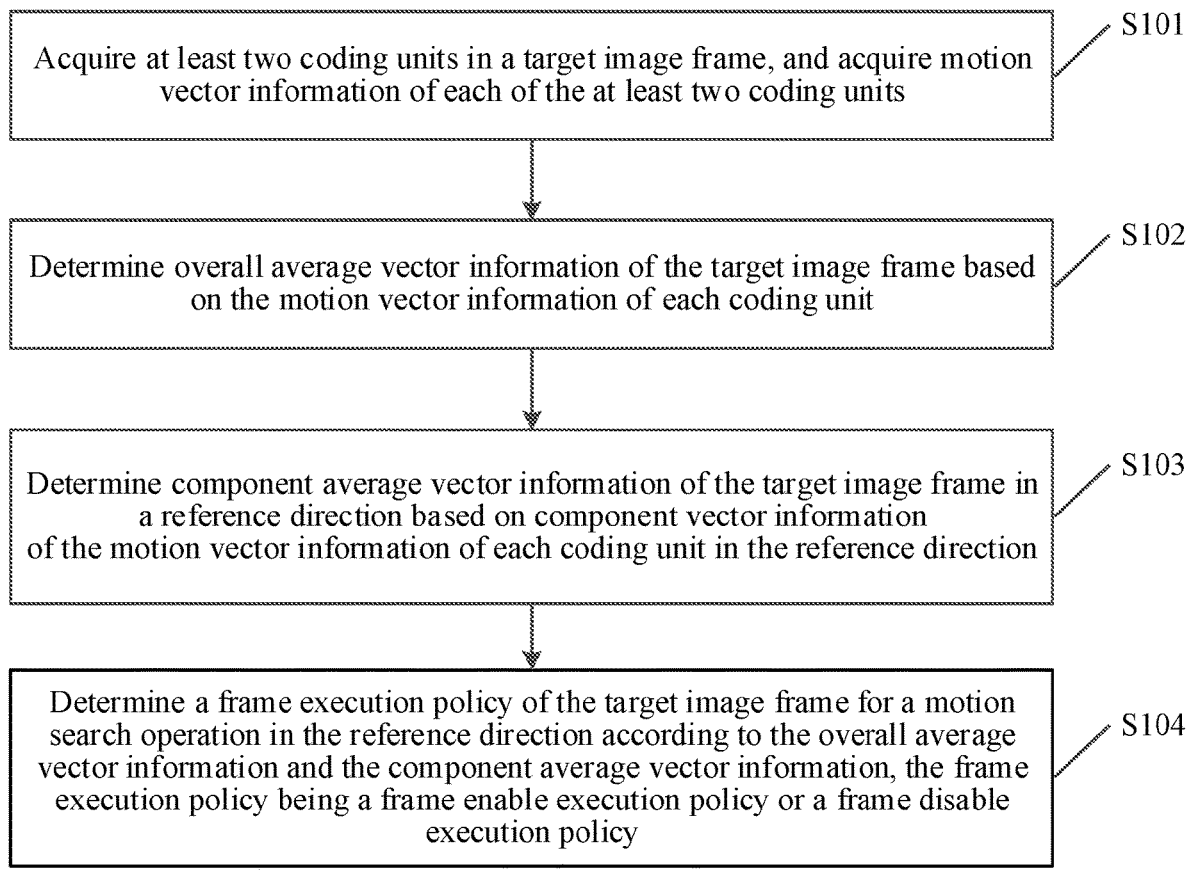
FIG. 3 is a schematic flowchart of a data coding method according to this application.

Referring to FIG. 3, FIG. 3 is a schematic flowchart of a data coding method according to this application. As shown in FIG. 3, the method may include the following steps:

Step S101: Acquire at least two coding units in an image frame (or referred as target image frame), and acquire motion vector information of each of the at least two coding units.

Specifically, an execution body in the embodiment of this application may be any computer device or a device cluster including multiple computer devices. The computer device may be a server, or a terminal device, and no limits are made thereto. Descriptions are made herein taking the execution body in this application being a server as an example. References are made to the following content descriptions.

The server may acquire video data. The video data may be any piece of video data. The video data is sent by a terminal device to the server. The terminal device may send the video data to the server so as to request the server to code the video data. For example, the video data may be video data shot by a camera in real time, such as online conference video data. Alternatively, the video data may be video data shared by a screen.

The server, when coding the video data, may frame the video data to obtain multiple (at least two) image frames in the video data. Therefore, the image frame may be any image frame in the multiple image frames obtained by framing the video data. The server, when coding the video data, needs to code each image frame in the video data. Descriptions are made herein taking coding of the image frame in the video data by the server as an example. It can be understood that the server codes each image frame in the video data based on the same principle. References are made to the following content descriptions.

The server may divide the image frame into multiple coding units. A coding unit represents an image block in the image frame. Dividing the image frame into the multiple coding units may implement block-based coding of the image frame.

Optionally, the server may divide the image frame into the multiple coding units in the following manner. First, the server may divide the image frame into multiple coding regions of the same size. Then, the server may further divide each coding region to obtain multiple coding units in the coding regions respectively. All the coding units in all the coding regions are the multiple coding units in the image frame.

The server may further acquire motion vector information (referred to as a motion vector, recorded as mv, for short) of each coding unit of the image frame. The motion vector information of each coding unit of the image frame represents a relative motion between the image frame and a reference image frame. The reference image frame may be an image frame adjacent to the image frame and before the image frame in the video data. For example, the reference image frame may be a previous image frame of the image frame in the video data. Therefore, it can be understood that the motion vector information of each coding unit of the image frame indicates a change of the image frame relative to the previous image frame (i.e., the reference image frame). That is, the motion vector information of each coding unit of the image frame indicates motions that implement change from the reference image frame to the image frame.

Therefore, the motion vector information of each coding unit of the image frame may be acquired in the following manner.

The server, when coding the reference image frame, may divide the reference image frame into multiple image blocks. The multiple image blocks may be understood as multiple coding units of the reference image frame. The server may acquire an image block similar to each coding unit of the image frame from the multiple image blocks obtained by dividing the reference image frame, as a predicted image block corresponding to each coding unit.

The reference image frame and the image frame may be the same in size. Positions of the image blocks of the reference image frame may be in one-to-one correspondence to those of the coding units of the image frame. That is, the predicted image block in the reference image frame corresponding to each coding unit of the image frame may be an image block in the reference image frame at the same corresponding position as each coding unit of the image frame. The image blocks and coding units at the same positions in the reference image frame and the image frame may be regarded as being similar.

Therefore, the server may detect a relative shift between each coding unit and the corresponding predicted image block. The relative shift represents a motion from the predicted image block to the corresponding coding unit. Further, the server may obtain the motion vector information of each coding unit according to the relative shift between each coding unit and the corresponding predicted image block and target motion vector accuracy.

The target motion vector accuracy may be set according to a practical application scenario, and indicates accuracy of the motion vector information of each coding unit. For example, the target motion vector accuracy may be $\frac{1}{16}$-pixel accuracy, $\frac{1}{4}$-pixel accuracy, $\frac{1}{2}$-pixel accuracy, 1-pixel accuracy, 2-pixel accuracy, 4-pixel accuracy, or 8-pixel accuracy.

In practice, the server, before coding the video data, may pre-analyze the video data, mainly for analytically determining how to code the video data with a minimal rate distortion cost. The rate distortion cost weighs both a distortion and code rate during coding of the video data. The server may obtain motion vector information of each coding unit of each image frame during pre-analysis of the video data.

Figure 4:
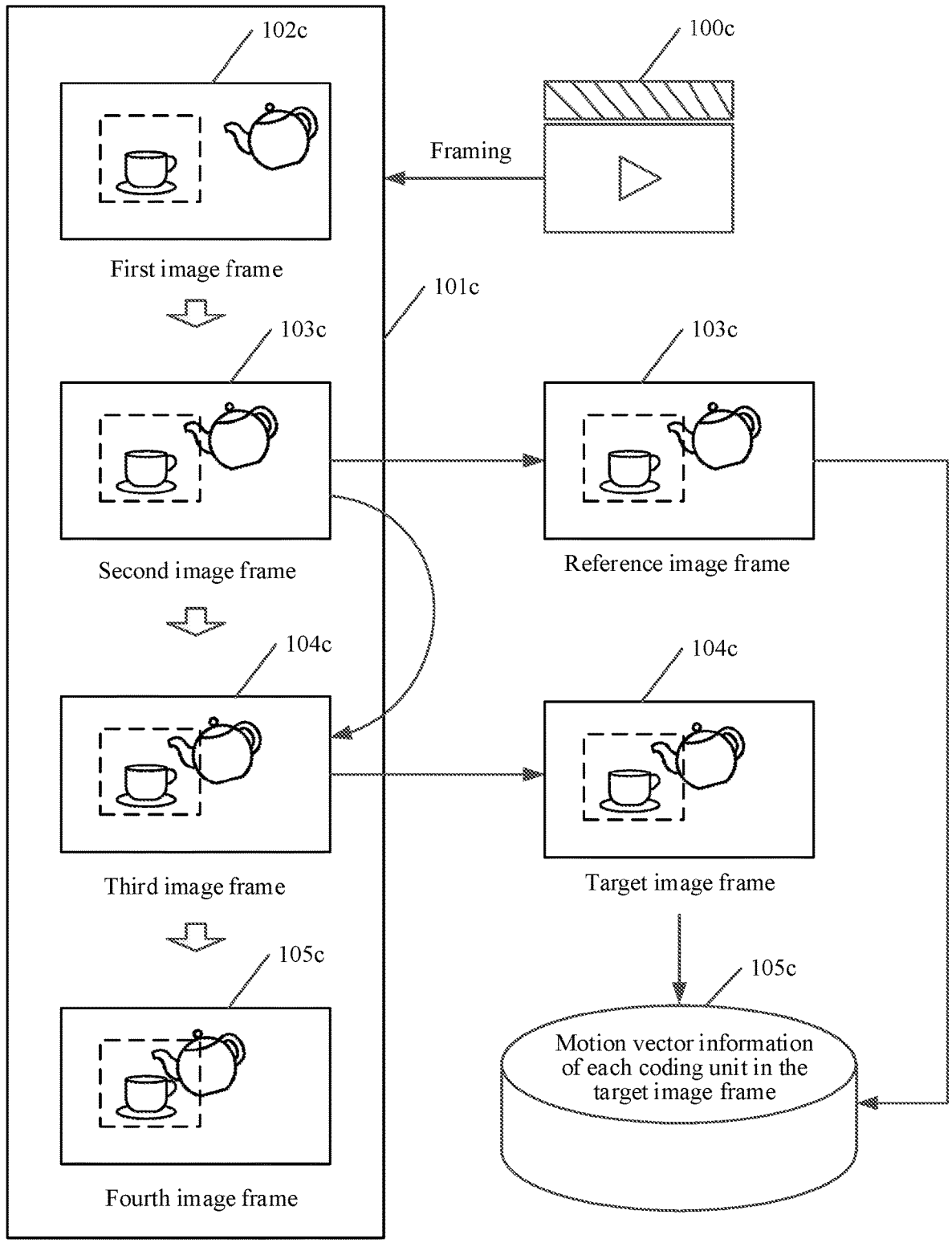
FIG. 4 is a schematic scenario diagram of acquiring motion vector information according to this application.

Referring to FIG. 4, FIG. 4 is a schematic scenario diagram of acquiring motion vector information according to this application. As shown in FIG. 4, the server may frame video data 100c to obtain multiple image frames in region 101c. In other words, the video data 100c may include an image frame 102c, an image frame 103c, an image frame 104c, and an image frame 105c.

The server may determine any one of the image frame 102c, the image frame 103c, the image frame 104c, and the image frame 105c as a image frame. For example, the image frame 104c is determined as the image frame herein. Therefore, a reference image frame may be the previous image frame 103c of the image frame 104c. The server may obtain motion vector information 105c of each coding unit of the image frame according to a relative motion between each coding unit of the image frame and an image block at a corresponding position in the reference image frame.

Step S102: Determine overall average vector information of the image frame based on the motion vector information of each coding unit.

Specifically, the server may acquire horizontal component vector information and vertical component vector information in the motion vector information of each coding unit of the image frame. Horizontal component vector information in motion vector information of a coding unit is a component of the motion vector information of the coding unit in a horizontal direction (which can be understood as an x direction of an xy plane-coordinate system). Similarly, vertical component vector information in motion vector information of a coding unit is a component of the motion vector information of the coding unit in a vertical direction (which can be understood as a y direction of the xy plane-coordinate system). It can be understood that motion vector information of a coding unit is a vector, and both horizontal component vector information and vertical component vector information corresponding to motion vector information of a coding unit are also vectors.

As a vector, the motion vector information of the coding unit has a direction and a magnitude. The magnitude of the motion vector information is a length of the motion vector information (i.e., a length of the vector), which may be referred to as a modulus of the motion vector information. The server may obtain a modulus of the motion vector information of each coding unit according to the horizontal component vector information and vertical component vector information corresponding to each coding unit. The modulus of the motion vector information of each coding unit of the image frame may be referred to as a motion vector value (or referred as unit motion vector value) corresponding to each coding unit.

For example, a modulus of horizontal component vector information of motion vector information of a coding unit is x1, and a modulus of vertical component vector information of the motion vector information of the coding unit is x2. In such case, the unit motion vector value corresponding to the motion vector information of the coding unit is equal to the modulus of the motion vector information of the coding unit as well as a value obtained by performing root extraction on a sum of a square of the modulus x1 of the horizontal component vector information and a square of the modulus x2 of the vertical component vector information.

Through the above process, the server may calculate the unit motion vector value corresponding to each coding unit. The server may calculate an average value of the unit motion vector values corresponding to all the coding units of the image frame as the overall average vector information. For example, the server may calculate a sum of the unit motion vector values respectively corresponding to all the coding units, and then divide the sum by a total number of all the coding units to obtain the overall average vector information.

For example, the image frame includes a coding unit 1, a coding unit 2, and a coding unit 3. A unit motion vector value corresponding to the coding unit 1 is 4, a unit motion vector value corresponding to the coding unit 2 is 5, and a unit motion vector value corresponding to the coding unit 3 is 6. Therefore, the overall average vector information of the image frame is $(4+5+6)/3=5$.

Step S103: Determine component average vector information of the image frame in a reference direction based on component vector information of the motion vector information of each coding unit in the reference direction.

Specifically, the reference direction herein may refer to a horizontal reference direction (referred to as a horizontal direction for short) or a vertical reference direction (referred to as a vertical direction for short). Therefore, the component vector information of the motion vector information herein may be component information in any one of the horizontal reference direction and the vertical reference direction.

When the reference direction is the horizontal reference direction, the server may acquire the component average vector information of the image frame in the reference direction through the following process.

The server may obtain a horizontal component value corresponding to each coding unit according to horizontal component vector information of the motion vector information of each coding unit (the coding unit in the description below refers to the coding unit of the image frame) in the horizontal reference direction. The horizontal component value is a magnitude of the horizontal component vector information. In other words, a modulus of horizontal component vector information of motion vector information of a coding unit in the horizontal reference direction may be referred to as a horizontal component value corresponding to the coding unit.

The server may determine the component average vector information according to the horizontal component value corresponding to each coding unit and a unit number of the at least two coding units as follows: the server may determine an average value of the horizontal component values respectively corresponding to all the coding units as the component average vector information of the image frame. That is, the server may calculate a sum of the horizontal component values respectively corresponding to all the coding units, and then divide the sum by a total number (referred to as a unit number) of all the coding units to obtain the component average vector information of the image frame.

For example, the image frame includes a coding unit 1, a coding unit 2, and a coding unit 3. A horizontal component value corresponding to the coding unit 1 is 6, a horizontal component value corresponding to the coding unit 2 is 7, and a horizontal component value corresponding to the coding unit 3 is 8. Therefore, the component average vector information of the image frame is $(6+7+8)/3=7$.

Figure 5:
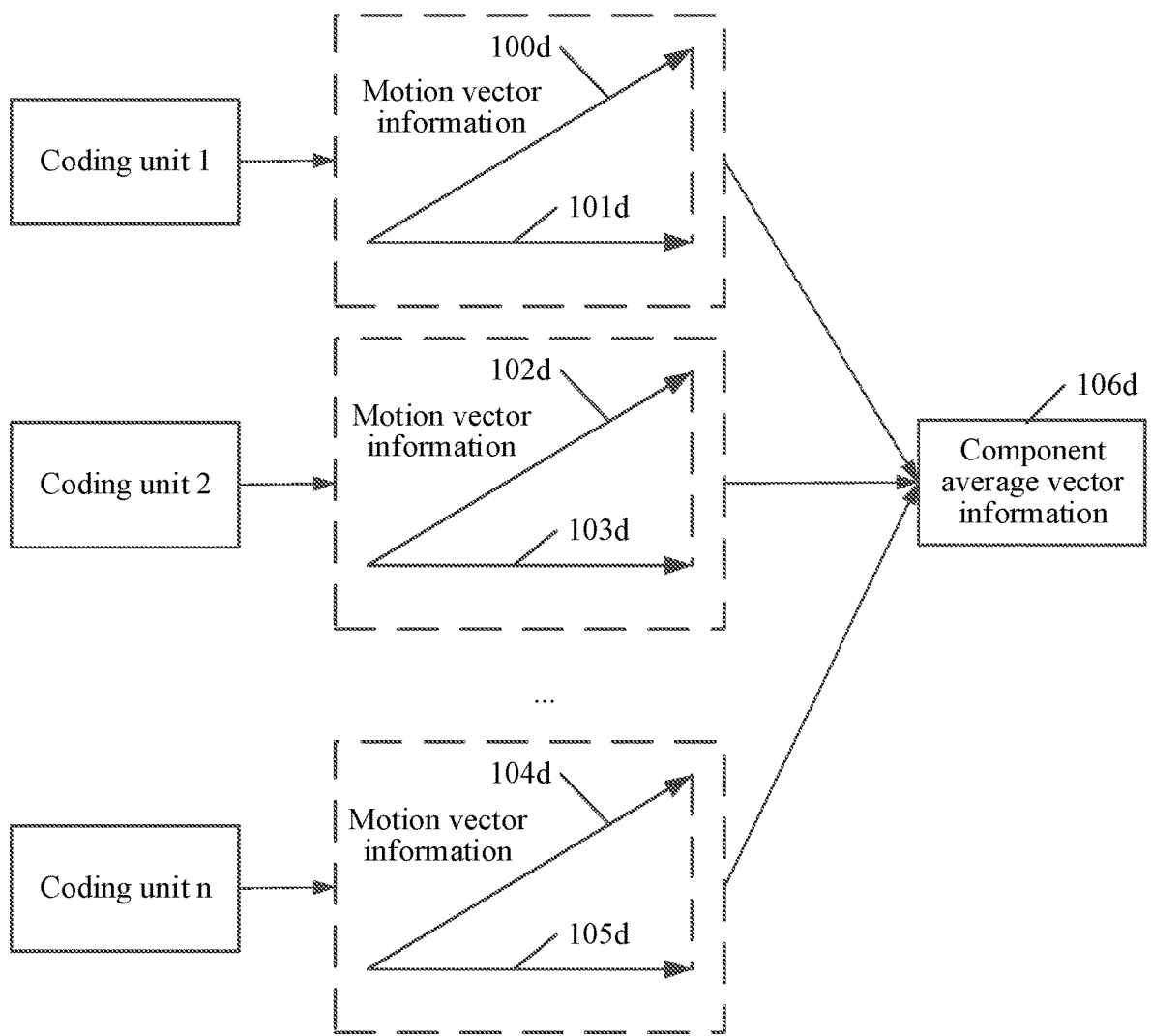
FIG. 5 is a schematic scenario diagram of acquiring component average vector information according to this application.

Referring to FIG. 5, FIG. 5 is a schematic scenario diagram of acquiring component average vector information according to this application. As shown in FIG. 5, the image frame may include a coding unit 1, a coding unit 2, ..., and a coding unit n. A value of n is determined according to a practical application scenario.

Horizontal component vector information of motion vector information 100d of the coding unit 1 in the horizontal reference direction is horizontal component vector information 101d. Horizontal component vector information of motion vector information 102d of the coding unit 2 in the horizontal reference direction is horizontal component vector information 103d. Horizontal component vector information of motion vector information 104d of the coding unit n in the horizontal reference direction is horizontal component vector information 105d.

Therefore, a horizontal component value corresponding to the coding unit 1 is a modulus of the horizontal component vector information 101d, a horizontal component value corresponding to the coding unit 2 is a modulus of the horizontal component vector information 103d, and a horizontal component value corresponding to the coding unit n is a modulus of the horizontal component vector information 105d. The modulus refers to a length of a remaining line segment of the vector after the direction element is removed.

Therefore, the server may determine an average value of the horizontal component value corresponding to the coding unit 1, the horizontal component value corresponding to the coding unit 2, ..., and the horizontal component value corresponding to the coding unit n as component average vector information 106d of the image frame.

Similarly, when the reference direction is the vertical reference direction, the server may acquire the component average vector information of the image frame in the reference direction through the following process.

The server may obtain a vertical component value corresponding to each coding unit according to vertical component vector information of the motion vector information of each coding unit in the vertical reference direction. The vertical component value is a magnitude of the vertical component vector information. In other words, a modulus of vertical component vector information of motion vector information of a coding unit in the vertical reference direction may be referred to as a vertical component value corresponding to the coding unit.

The server may determine the component average vector information according to the vertical component value corresponding to each coding unit and a unit number of the at least two coding units as follows: the server may determine an average value of the vertical component values respectively corresponding to all the coding units as the component average vector information of the image frame. That is, the server may calculate a sum of the vertical component values respectively corresponding to all the coding units, and then divide the sum by a total number (referred to as a unit number) of all the coding units to obtain the component average vector information of the image frame.

For example, the image frame includes a coding unit 1, a coding unit 2, and a coding unit 3. A vertical component value corresponding to the coding unit 1 is 10, a vertical component value corresponding to the coding unit 2 is 20, and a vertical component value corresponding to the coding unit 3 is 30. Therefore, the component average vector information of the image frame is (10+20+30)/3=20.

Figure 6:
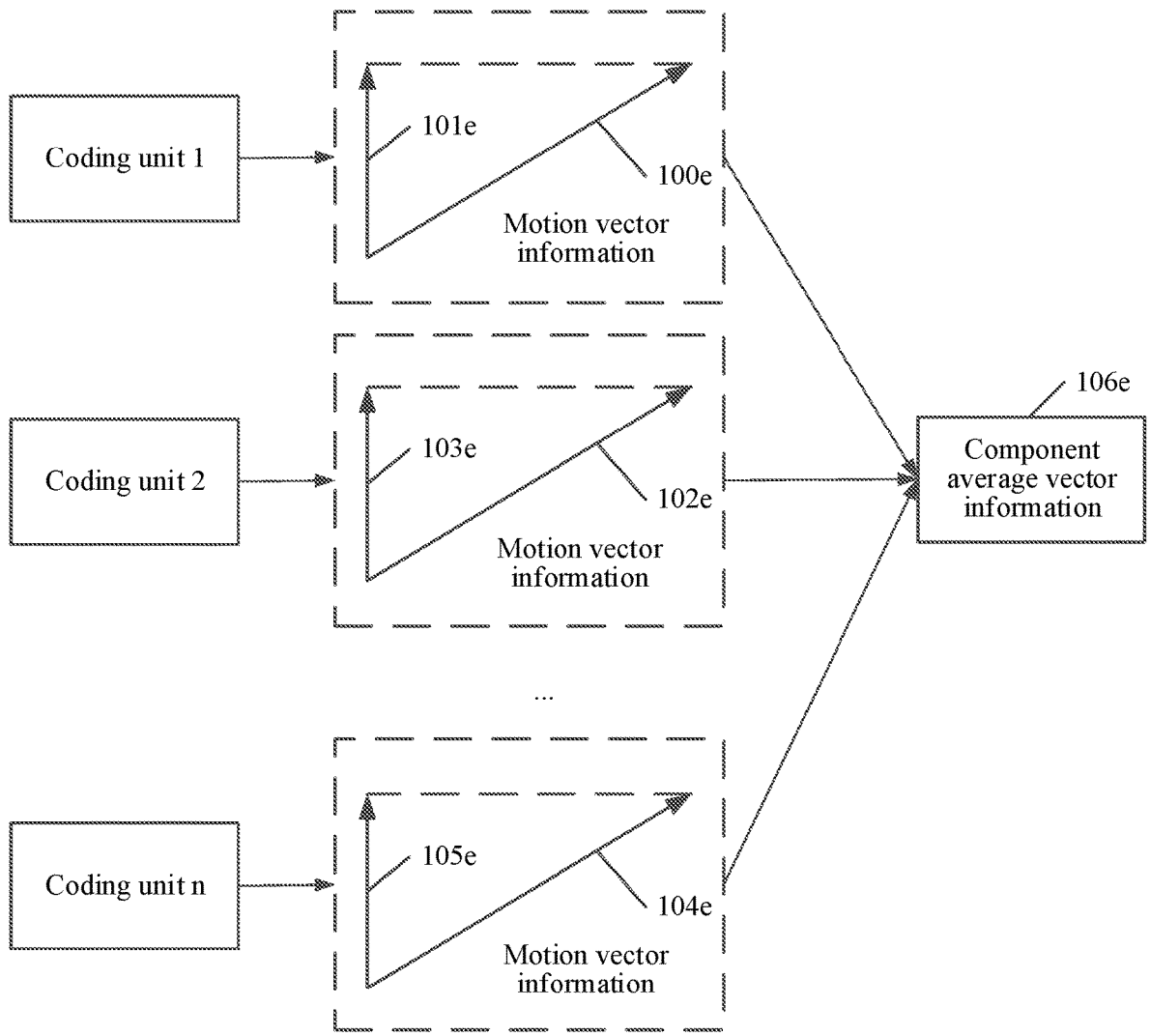
FIG. 6 is a schematic scenario diagram of acquiring component average vector information according to this application.

Referring to FIG. 6, FIG. 6 is a schematic scenario diagram of acquiring component average vector information according to this application. As shown in FIG. 6, the image frame may include a coding unit 1, a coding unit 2, ..., and a coding unit n. A value of n is determined according to a practical application scenario.

Vertical component vector information of motion vector information 100e of the coding unit 1 in the vertical reference direction is vertical component vector information 101e. Vertical component vector information of motion vector information 102e of the coding unit 2 in the vertical reference direction is vertical component vector information 103e. Vertical component vector information of motion vector information 104e of the coding unit n in the vertical reference direction is vertical component vector information 105e.

Therefore, a vertical component value corresponding to the coding unit 1 is a modulus of the vertical component vector information 101e, a vertical component value corresponding to the coding unit 2 is a modulus of the vertical component vector information 103e, and a vertical component value corresponding to the coding unit n is a modulus of the vertical component vector information 105e.

Therefore, the server may determine an average value of the vertical component value corresponding to the coding unit 1, the vertical component value corresponding to the coding unit 2, ..., and the vertical component value corresponding to the coding unit n as component average vector information 106e of the image frame.

Figure 7:
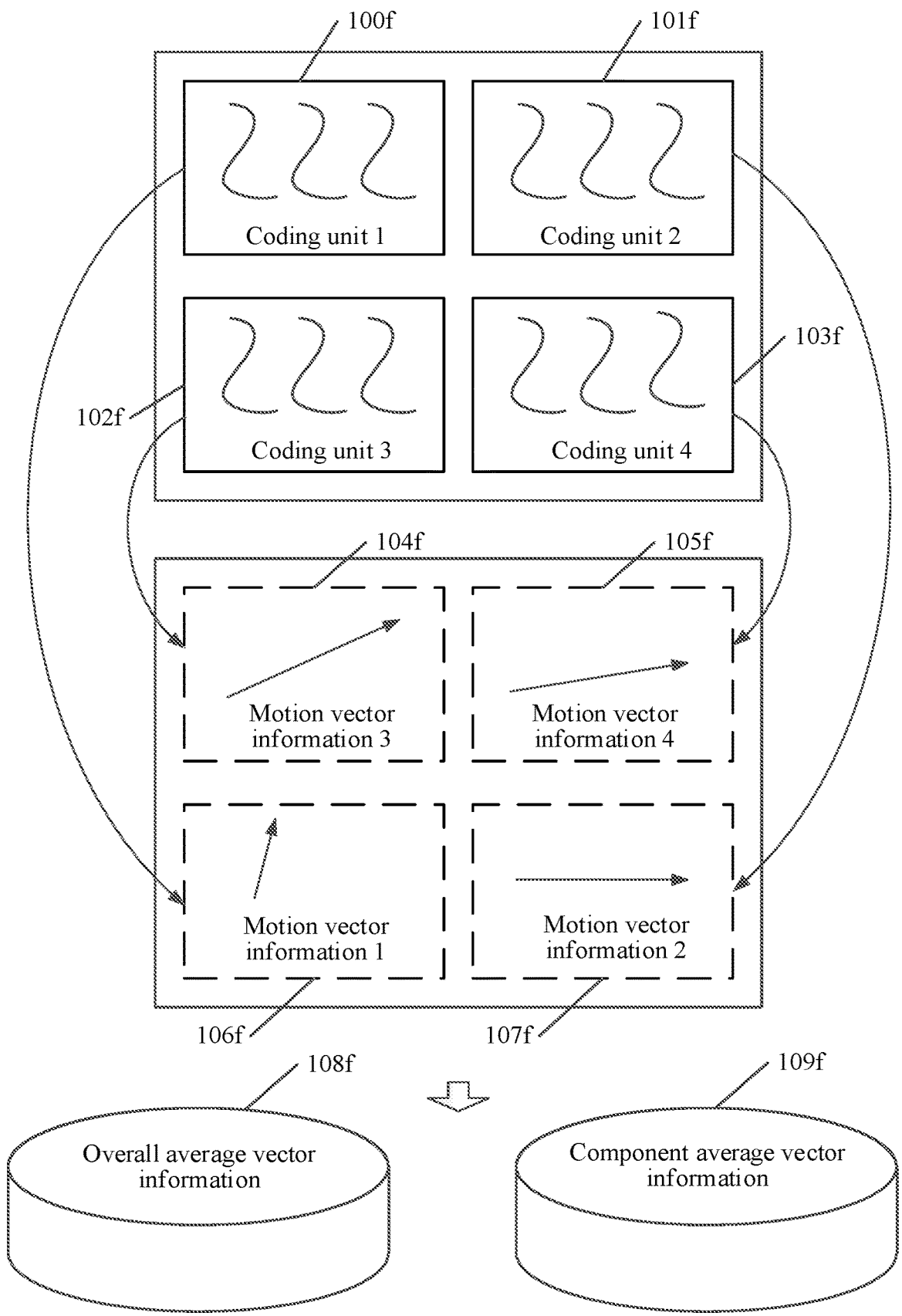
FIG. 7 is a schematic scenario diagram of acquiring vector information according to this application.

Referring to FIG. 7, FIG. 7 is a schematic scenario diagram of acquiring vector information according to this application. As shown in FIG. 7, the coding units of the image frame may include a coding unit 1, a coding unit 2, a coding unit 3, and a coding unit 4. Motion vector information of the coding unit 1 may be motion vector information 106f. Motion vector information of the coding unit 2 may be motion vector information 107f. Motion vector information of the coding unit 3 may be motion vector information 104f. Motion vector information of the coding unit 4 may be motion vector information 105f.

The server may determine an average value of moduli of the motion vector information 104f, the motion vector information 105f, the motion vector information 106f, and the motion vector information 107f as overall average vector information 108f of the image frame. The server may determine an average value of moduli of components of the motion vector information 104f, the motion vector information 105f, the motion vector information 106f, and the motion vector information 107f in the horizontal direction or the vertical direction as component average vector information 109f of the image frame.

In some implementations, the server may determine an average, whose calculation is based on vector algebra, of the motion vector information 104f, the motion vector information 105f, the motion vector information 106f, and the motion vector information 107f as the overall average vector information 108f of the image frame.

Step S104: Determine a frame execution policy of the image frame for a motion search operation in the reference direction according to the overall average vector information and the component average vector information, the frame execution policy being a frame enable execution policy or a frame disable execution policy. In some implementations, the step S104 may further include encoding the image frame according to the determined frame execution policy.

Specifically, the reference direction may be the horizontal direction and the vertical direction, so the motion search operation correlated with the reference direction may be a rood-pattern search algorithm-based operation. A rood-pattern search algorithm is mainly used for searching for motion directions of the motion vector information of the image frame or the coding unit in the horizontal direction and/or the vertical direction.

Executing the motion search operation correlated with the reference direction on the image frame indicates executing the rood-pattern search algorithm-based operation on the image frame, namely indicating that the frame execution policy of the image frame for the motion search operation is the frame enable execution policy. Skipping executing the motion search operation correlated with the reference direction on the image frame indicates skipping executing the rood-pattern search algorithm-based operation on the image frame, namely indicating that the frame execution policy of the image frame for the motion search operation is the frame disable execution policy.

Executing the motion search operation correlated with the reference direction on the image frame may find a motion direction of the motion vector information in the image frame. Finding the motion direction of the motion vector information in the image frame may further code the image frame better.

According to this application, whether there is an apparent motion in the horizontal direction or the vertical direction in the image frame is determined according to the overall average vector information and the component average vector information. When there is an apparent motion in the horizontal direction or the vertical direction in the image frame, the motion search operation correlated with the reference direction may be executed on the motion vector information in the image frame, namely a rood-pattern search operation is executed. Otherwise, the motion search operation correlated with the reference direction is not executed on the image frame, namely the rood-pattern search operation is not executed. That is, when there is no apparent motion in the horizontal direction or the vertical direction in the image frame, the motion search operation correlated with the reference direction may not be executed on the motion vector information in the image frame.

No matter whether to execute the motion search operation correlated with the reference direction (i.e., the rood-pattern search algorithm-based operation) on the image frame, it is necessary to execute an ordinary motion search operation on the image frame. The rood-pattern search algorithm is mainly used for searching for a motion direction of the image frame in the horizontal direction or the vertical direction. The ordinary motion search operation may refer to searching for a motion direction of each pixel in the image frame.

It can be understood that the rood-pattern search algorithm-based operation is executed on the image frame to help execute the ordinary motion search operation on the image frame. When there is an apparent motion in the horizontal direction or the vertical direction in the image frame, executing the rood-pattern search algorithm on the image frame may ensure more accuracy and rapid search for the motion direction of the motion vector information of the image frame. When there is no apparent motion in the horizontal direction or the vertical direction in the image frame, executing the rood-pattern search algorithm-based operation on the image frame is of little use. Therefore, when there is no apparent motion in the horizontal direction or the vertical direction in the image frame, the rood-pattern search algorithm-based operation may not be executed on the image frame (namely the motion search operation correlated with the reference direction is not executed).

It is usually time-consuming to execute the rood-pattern search algorithm-based operation on an image frame, so executing the rood-pattern search algorithm-based operation unconditionally on each image frame in the video data during coding of the video data may lead to relatively high time consumption in coding of the image frame of the video data and further relatively high time consumption in coding of the video data. Therefore, according to the method provided in this application, when there is no apparent motion in the horizontal direction or the vertical direction in a certain image frame (this image frame may be determined as the above-mentioned image frame), the rood-pattern search algorithm-based operation may not be executed on this image frame. Therefore, the coding speed for the image frame may be increased, and the coding speed for the video data may further be increased.

The component average vector information may be component average vector information in any one of the horizontal direction and the vertical direction. Therefore, it can be understood that whether there is an apparent motion in the horizontal direction or the vertical direction in the image frame may be determined based on the component average vector information in the horizontal direction or the vertical direction.

This is because if the component average vector information corresponds to the horizontal direction, when the ratio of the component average vector information of the image frame in the horizontal direction to the overall average vector information is greater than or equal to a certain threshold (which is configurable, referred to as a first proportion threshold), it indicates that the component average vector information of the image frame in the horizontal direction accounts for a large proportion of the overall average vector information, namely there is an apparent motion in the horizontal direction in the image frame. When the ratio of the component average vector information of the image frame in the horizontal direction to the overall average vector information is less than a certain threshold (which is configurable, referred to as a second proportion threshold), it indicates that the component average vector information of the image frame in the horizontal direction accounts for a small proportion of the overall average vector information, namely there is no apparent motion in the horizontal direction but an apparent motion in the vertical direction in the image frame.

Similarly, if the component average vector information corresponds to the vertical direction, when the ratio of the component average vector information of the image frame in the vertical direction to the overall average vector information is greater than or equal to a certain threshold (or the above-mentioned first proportion threshold), it indicates that the component average vector information of the image frame in the vertical direction accounts for a large proportion of the overall average vector information, namely there is an apparent motion in the vertical direction in the image frame. When the ratio of the component average vector information of the image frame in the vertical direction to the overall average vector information is less than a certain threshold (which may be the above-mentioned second proportion threshold), it indicates that the component average vector information of the image frame in the vertical direction accounts for a small proportion of the overall average vector information, namely there is no apparent motion in the vertical direction but an apparent motion in the horizontal direction in the image frame.

The first proportion threshold is greater than the second proportion threshold.

In other words, if the component average vector information of the image frame in the horizontal direction accounts for a large proportion of the overall average vector information, the component average vector information of the image frame in the vertical direction accounts a small proportion of the overall average vector information. Conversely, when the component average vector information of the image frame in the vertical direction accounts for a large proportion of the overall average vector information, the component average vector information of the image frame in the horizontal direction accounts for a small proportion of the overall average vector information. In other words, the component average vector information in the horizontal direction is negatively correlated with that in the vertical direction, and if one is large, the other is small.

In some implementations, the ratio of the component average vector information in the horizontal direction is negatively correlated with that in the vertical direction, and if one is large, the other is small.

Therefore, the above process may be summarized as follows.

The ratio of the component average vector information to the overall average vector information may be referred to as a frame component proportion value ranging from 0 to 1. When the frame component proportion value is greater than or equal to the first proportion threshold, or the frame component proportion value is less than or equal to the second proportion threshold, it indicates that there is an apparent motion in the horizontal direction or the vertical direction in the image frame. Therefore, it may be determined that the frame execution policy of the image frame for the motion search operation correlated with the reference direction is the frame enable execution policy.

When the frame component proportion value is less than the first proportion threshold and greater than the second proportion threshold, it indicates that there is no apparent motion in the horizontal direction or the vertical direction in the image frame. Therefore, it may be determined that the frame execution policy (i.e., the rood-pattern search algorithm-based operation) of the image frame for the motion search operation correlated with the reference direction is the frame disable execution policy.

When determining that the frame execution policy of the image frame for the motion search operation correlated with the reference direction is the frame disable execution policy, the server may not execute the rood-pattern search algorithm-based operation on all the coding units in the image frame.

Moreover, when determining that the frame execution policy of the image frame for the motion search operation correlated with the reference direction is the frame enable execution policy, the server may further specifically determine coding units that need the rood-pattern search algorithm-based operation and coding units that do not need the rood-pattern search algorithm-based operation in the multiple coding units of the image frame. Therefore, the coding speed for the image frame may further be increased. References are made to the following content descriptions.

The server determines whether the rood-pattern search algorithm-based operation needs to be executed on each coding unit based on the same principle as determining whether the rood-pattern search algorithm-based operation needs to be executed on the image frame, except that one is of an image frame level while the other is of a coding unit level.

Specifically, the server may obtain a motion vector value (or referred as unit motion vector value) and a component vector value (or referred as unit component vector value) of each coding unit according to the motion vector information of each coding unit. A unit motion component value of a coding unit may refer to a magnitude, i.e., modulus, of motion vector information of the coding unit. A unit component vector value of a coding unit may refer to a modulus of horizontal component vector information of motion vector information of the coding unit in the horizontal direction, or a modulus of vertical component vector information of the motion vector information of the coding unit in the vertical direction.

Figure 8:
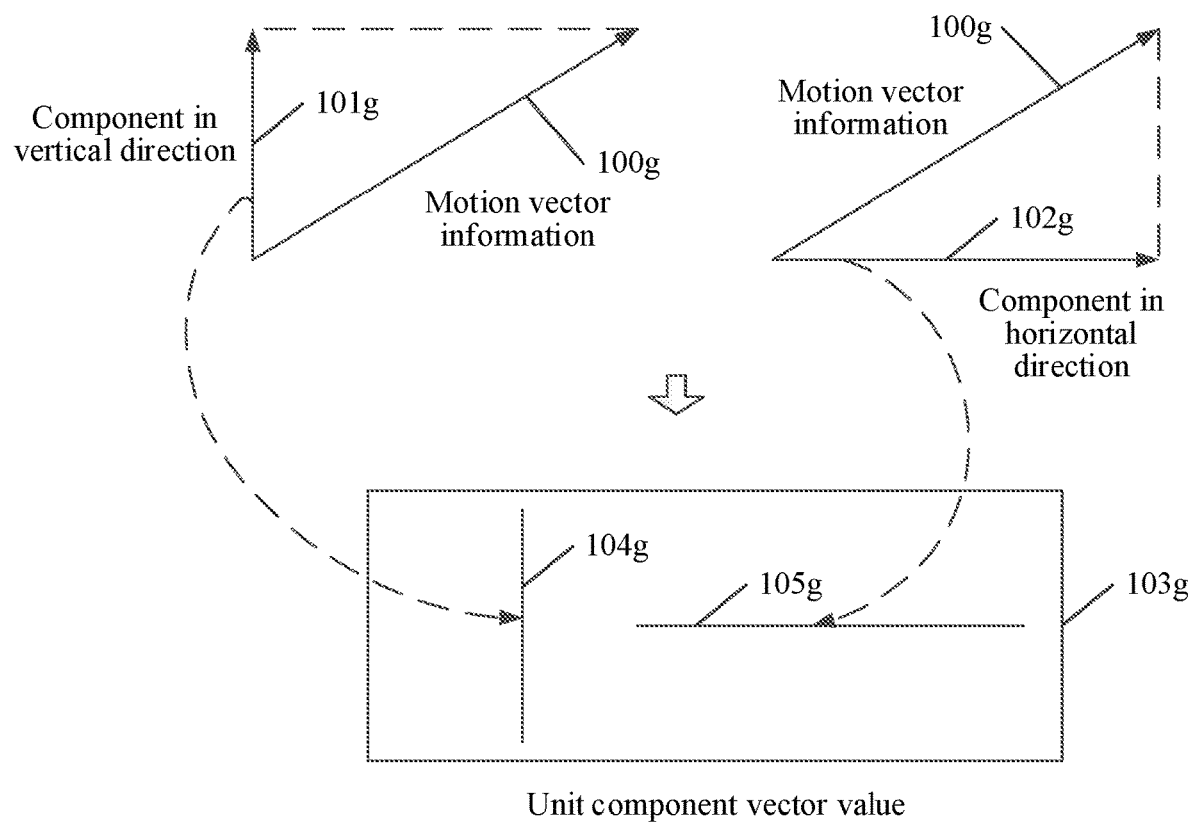
FIG. 8 is a schematic scenario diagram of acquiring a unit component vector value according to this application.

Referring to FIG. 8, FIG. 8 is a schematic scenario diagram of acquiring a unit component vector value according to this application. As shown in FIG. 8, motion vector information 100g may be motion vector information of a coding unit of the image frame. A component of the motion vector information 100g in the vertical direction is vertical component vector information 101g. A component of the motion vector information 100g in the horizontal direction is horizontal component vector information 102g.

As shown in region 103g, the server may determine a modulus 104g of the vertical component vector information 101g or a modulus 105g of the horizontal component vector information 102g as a unit component vector value of the coding unit that the motion vector information 100g belongs to.

If the rood-pattern search algorithm-based operation needs to be executed on a certain coding unit, it may be determined that a unit execution policy of the coding unit for the motion search operation correlated with the reference direction is a unit enable execution policy. If the rood-pattern search algorithm-based operation needs not to be executed on a certain coding unit, it may be determined that a unit execution policy of the coding unit for the motion search operation correlated with the reference direction is a unit disable execution policy.

Whether a unit execution policy of each coding unit is the unit enable execution policy or the unit disable execution policy is determined based on the same principle. Therefore, assuming that the coding units of the image frame include a coding unit bi, i being a positive integer less than or equal to the total number of all the coding units of the image frame, descriptions are made herein taking the determination of whether a unit execution policy of the coding unit bi is the unit enable execution policy or the unit disable execution policy as an example.

A ratio of a unit component vector value corresponding to the coding unit bi to a unit motion vector value of the coding unit bi may be referred to as a unit component proportion value corresponding to the coding unit bi. When the unit component proportion value corresponding to the coding unit bi is greater than or equal to a certain threshold (which is configurable, referred to as a third proportion threshold), or the unit component proportion value corresponding to the coding unit bi is less than or equal to a certain threshold (which is configurable, referred to as a fourth proportion threshold), it may be determined that there is an apparent motion in the horizontal direction or the vertical direction in the coding unit bi. Therefore, it may be determined that the unit execution policy of the coding unit bi is the unit enable execution policy. The third proportion threshold is greater than the fourth proportion threshold.

When the unit component proportion value corresponding to the coding unit bi is less than the third proportion threshold and greater than the fourth proportion threshold, it may be determined that there is no apparent motion in the horizontal direction or the vertical direction in the coding unit bi. Therefore, it may be determined that the unit execution policy of the coding unit bi is the unit disable execution policy.

Through the above process, the server may obtain the frame execution policy of the image frame, and when the frame execution policy of the image frame is the frame enable execution policy, may further obtain the unit execution policy of each coding unit of the image frame.

The server may code the video data that the image frame belongs to based on the obtained frame execution policy of the image frame and the unit execution policy of each coding unit, thereby obtaining coded data of the video data. The server may send the coded data to a video client. Then, the video client may decode the coded data to obtain decoded data of the video data, and further play the decoded data, so as to implement playing of the video data.

For example, the video data that the image frame belongs to may be sent by a video client of user 1 to the server. The video client of user 1 sends the video data to the server to request the server to send the video data to a video client of user 2. Therefore, the server codes the video data to obtain coded data of the video data, and then may send the coded data to the video client of user 2. Then, the video client of user 2 may decode the coded data to obtain decoded data, and play the decoded data.

According to this application, at least two coding units in a image frame are acquired, and motion vector information of each of the at least two coding units is acquired. Overall average vector information of the image frame is determined based on the motion vector information of each coding unit. Component average vector information of the image frame in a reference direction is determined based on component vector information of the motion vector information of each coding unit in the reference direction. A frame execution policy of the image frame for a motion search operation correlated with the reference direction is determined according to the overall average vector information and the component average vector information, the frame execution policy being a frame enable execution policy or a frame disable execution policy. It can be seen that, according to the method disclosed in this application, the frame execution policy to be used for the image frame may be determined according to a relationship (such as a proportion) between the component average vector information and overall average vector information of the image frame, and using different frame execution policies for the image frame may achieve different coding speeds for the image frame. Therefore, adaptively determining the frame execution policy to be used for the image frame may increase the coding speed for the image frame.

Figure 9:
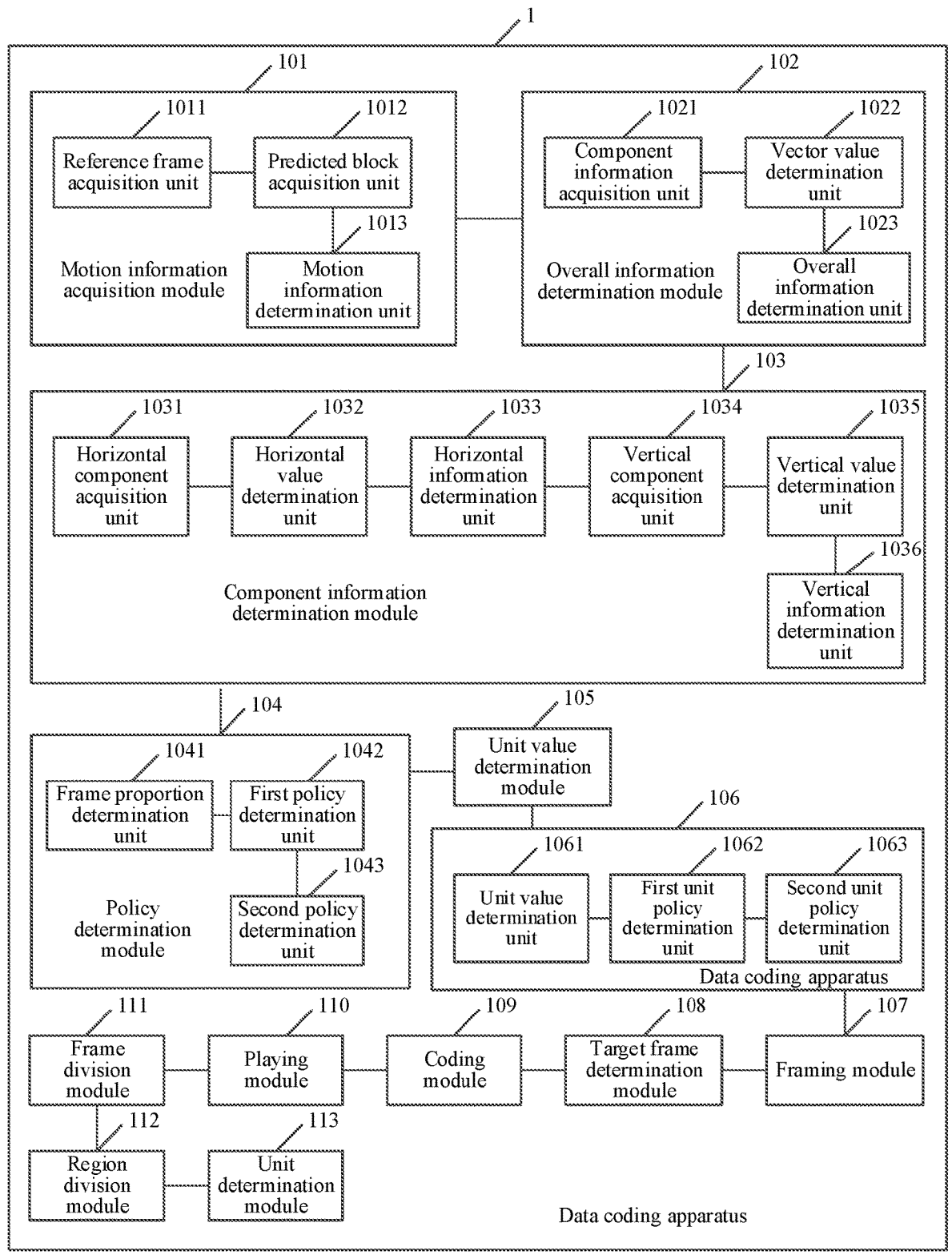
FIG. 9 is a schematic structural diagram of a data coding apparatus according to this application.

Referring to FIG. 9, FIG. 9 is a schematic structural diagram of a data coding apparatus according to this application. As shown in FIG. 9, the data coding apparatus 1 may include: a motion information acquisition module 101, an overall information determination module 102, a component information determination module 103, and a policy determination module 104.

The motion information acquisition module 101 is configured to acquire at least two coding units in a image frame, and acquire motion vector information of each of the at least two coding units.

The overall information determination module 102 is configured to determine overall average vector information of the image frame based on the motion vector information of each coding unit.

The component information determination module 103 is configured to determine component average vector information of the image frame in a reference direction based on component vector information of the motion vector information of each coding unit in the reference direction.

The policy determination module 104 is configured to determine a frame execution policy of the image frame for a motion search operation in the reference direction according to the overall average vector information and the component average vector information, the frame execution policy being a frame enable execution policy or a frame disable execution policy.

Specific function implementations of the motion information acquisition module 101, the overall information determination module 102, the component information determination module 103, and the policy determination module 104 refer to steps S101 to S104 in the embodiment corresponding to FIG. 3, and will not be elaborated herein.

The overall information determination module 102 includes: a component information acquisition unit 1021, a vector value determination unit 1022, and an overall information determination unit 1023.

The component information acquisition unit 1021 is configured to acquire horizontal component vector information and vertical component vector information in the motion vector information of each coding unit.

The vector value determination unit 1022 is configured to determine a unit motion vector value corresponding to each coding unit based on the horizontal component vector information and vertical component vector information corresponding to each coding unit.

The overall information determination unit 1023 is configured to determine the overall average vector information according to the unit motion vector value corresponding to each coding unit and a unit number of the at least two coding units.

Specific function implementations of the component information acquisition unit 1021, the vector value determination unit 1022, and the overall information determination unit 1023 refer to step S102 in the embodiment corresponding to FIG. 3, and will not be elaborated herein.

The reference direction includes a horizontal reference direction. The component vector information of the motion vector information of each coding unit in the reference direction includes horizontal component vector information.

The component information determination module 103 includes: a horizontal component acquisition unit 1031, a horizontal value determination unit 1032, and a horizontal information determination unit 1033.

The horizontal component acquisition unit 1031 is configured to acquire the horizontal component vector information of the motion vector information of each coding unit in the horizontal reference direction.

The horizontal value determination unit 1032 is configured to determine a horizontal component value corresponding to each coding unit according to the horizontal component vector information of each coding unit in the horizontal reference direction.

The horizontal information determination unit 1033 is configured to determine the component average vector information according to the horizontal component value corresponding to each coding unit and a unit number of the at least two coding units.

Specific function implementations of the horizontal component acquisition unit 1031, the horizontal value determination unit 1032, and the horizontal information determination unit 1033 refer to step S103 in the embodiment corresponding to FIG. 3, and will not be elaborated herein.

The reference direction includes a vertical reference direction. The component vector information of the motion vector information of each coding unit in the reference direction includes vertical component vector information.

The component information determination module 103 includes: a horizontal component acquisition unit 1034, a horizontal value determination unit 1035, and a horizontal information determination unit 1036.

The vertical component acquisition unit 1034 is configured to acquire the vertical component vector information of the motion vector information of each coding unit in the vertical reference direction.

The vertical value determination unit 1035 is configured to determine a vertical component value corresponding to each coding unit according to the vertical component vector information of each coding unit in the vertical reference direction.

The vertical information determination unit 1036 is configured to determine the component average vector information according to the vertical component value corresponding to each coding unit and a unit number of the at least two coding units.

Specific function implementations of the horizontal component acquisition unit 1034, the horizontal value determination unit 1035, and the horizontal information determination unit 1036 refer to step S103 in the embodiment corresponding to FIG. 3, and will not be elaborated herein.

The policy determination module 104 includes: a frame proportion determination unit 1041, a first policy determination unit 1042, and a second policy determination unit 1043.

The frame proportion determination unit 1041 is configured to determine a frame component proportion value according to the overall average vector information and the component average vector information.

The first policy determination unit 1042 is configured to determine, in case that the frame component proportion value is greater than or equal to a first proportion threshold or the frame component proportion value is less than or equal to a second proportion threshold, that the frame execution policy of the image frame for the motion search operation is the frame enable execution policy.

The second policy determination unit 1043 is configured to determine, in case that the frame component proportion value is less than the first proportion threshold and greater than the second proportion threshold, that the frame execution policy of the image frame for the motion search operation is the frame disable execution policy.

Specific function implementations of the frame proportion determination unit 1041, the first policy determination unit 1042, and the second policy determination unit 1043 refer to step S104 in the embodiment corresponding to FIG. 3, and will not be elaborated herein.

The apparatus 1 further includes: a unit value determination module 105 and a unit policy determination module 106.

The unit value determination module 105 is configured to determine a unit motion vector value and unit component vector value of each coding unit according to the motion vector information of each coding unit in response to determining that the frame execution policy of the image frame for the motion search operation is the frame enable execution policy.

The unit policy determination module 106 is configured to determine a unit execution policy of each coding unit for the motion search operation according to the unit motion vector value and unit component vector value corresponding to each coding unit.

Specific function implementations of the unit value determination module 105 and the unit policy determination module 106 refer to step S104 in the embodiment corresponding to FIG. 3, and will not be elaborated herein.

The unit execution policy is a unit enable execution policy or a unit disable execution policy. The at least two coding units include a coding unit bi, i being a positive integer less than or equal to a unit number of the at least two coding units.

The unit policy determination module 106 includes: a unit value determination unit 1061, a first unit policy determination unit 1062, and a second unit policy determination unit 1063.

The unit value determination unit 1061 is configured to determine a unit component proportion value corresponding to the coding unit bi according to the unit motion vector value and unit component vector value corresponding to the coding unit bi.

The first unit policy determination unit 1062 is configured to determine, in case that the unit component proportion value is greater than or equal to a third proportion threshold or the unit component proportion value is less than or equal to a fourth proportion threshold, that the unit execution policy of the coding unit bi for the motion search operation is the unit enable execution policy, the third proportion threshold being greater than the fourth proportion threshold.

The second unit policy determination unit 1063 is configured to determine, in case that the unit component proportion value is less than the third proportion threshold and greater than the fourth proportion threshold, that the unit execution policy of the coding unit bi for the motion search operation is the unit disable execution policy.

Specific function implementations of the unit value determination unit 1061, the first unit policy determination unit 1062, and the second unit policy determination unit 1063 refer to step S104 in the embodiment corresponding to FIG. 3, and will not be elaborated herein.

The motion information acquisition module 101 includes: a reference frame acquisition unit 1011, a predicted block acquisition unit 1012, and a motion information determination unit 1013.

The reference frame acquisition unit 1011 is configured to acquire a reference image frame of the image frame.

The predicted block acquisition unit 1012 is configured to acquire a predicted image block similar to each coding unit from the reference image frame.

The motion information determination unit 1013 is configured to determine the motion vector information of each coding unit according to a relative shift between each coding unit and the corresponding predicted image block and target motion vector accuracy.

Specific function implementations of the reference frame acquisition unit 1011, the predicted block acquisition unit 1012, and the motion information determination unit 1013 refer to step S101 in the embodiment corresponding to FIG. 3, and will not be elaborated herein.

The apparatus 1 further includes: a framing module 107 and a target frame determination module 108.

The framing module 107 is configured to frame video data to obtain multiple image frames in the video data.

The target frame determination module 108 is configured to determine the image frame from the multiple image frames.

The reference frame acquisition unit 1011 is further configured to:

acquire an image frame adjacent to the image frame from the multiple image frames as the reference image frame.

Specific function implementations of the framing module 107 and the target frame determination module 108 refer to step S101 in the embodiment corresponding to FIG. 3, and will not be elaborated herein.

The apparatus 1 further includes: a coding module 109 and a playing module 110.

The coding module 109 is configured to code the video data based on the determined frame execution policy of the image frame for the motion search operation to obtain coded data of the video data.

The playing module 110 is configured to synchronize the coded data to a video client such that the video client decodes the coded data to obtain decoded data of the video data and plays the decoded data.

Specific function implementations of the coding module 109 and the playing module 110 refer to step S104 in the embodiment corresponding to FIG. 3, and will not be elaborated herein.

The apparatus 1 further includes: a frame division module 111, a region division module 112, and a unit determination module 113.

The frame division module 111 is configured to divide the image frame into at least two coding regions.

The region division module 112 is configured to perform region division on each of the at least two coding regions to obtain a coding unit that each coding region belongs to.

The unit determination module 113 is configured to determine the coding unit that each coding region belongs to as the at least two coding units in the image frame.

Specific function implementations of the frame division module 111, the region division module 112, and the unit determination module 113 refer to step S101 in the embodiment corresponding to FIG. 3, and will not be elaborated herein.

According to this application, at least two coding units in a image frame are acquired, and motion vector information of each of the at least two coding units is acquired. Overall average vector information of the image frame is determined based on the motion vector information of each coding unit. Component average vector information of the image frame in a reference direction is determined based on component vector information of the motion vector information of each coding unit in the reference direction. A frame execution policy of the image frame for a motion search operation correlated with the reference direction is determined according to the overall average vector information and the component average vector information, the frame execution policy being a frame enable execution policy or a frame disable execution policy. It can be seen that, according to the apparatus disclosed in this application, the frame execution policy to be used for the image frame may be determined according to a relationship (such as a proportion) between the component average vector information and overall average vector information of the image frame, and using different frame execution policies for the image frame may achieve different coding speeds for the image frame. Therefore, adaptively determining the frame execution policy to be used for the image frame may increase the coding speed for the image frame.

Figure 10:
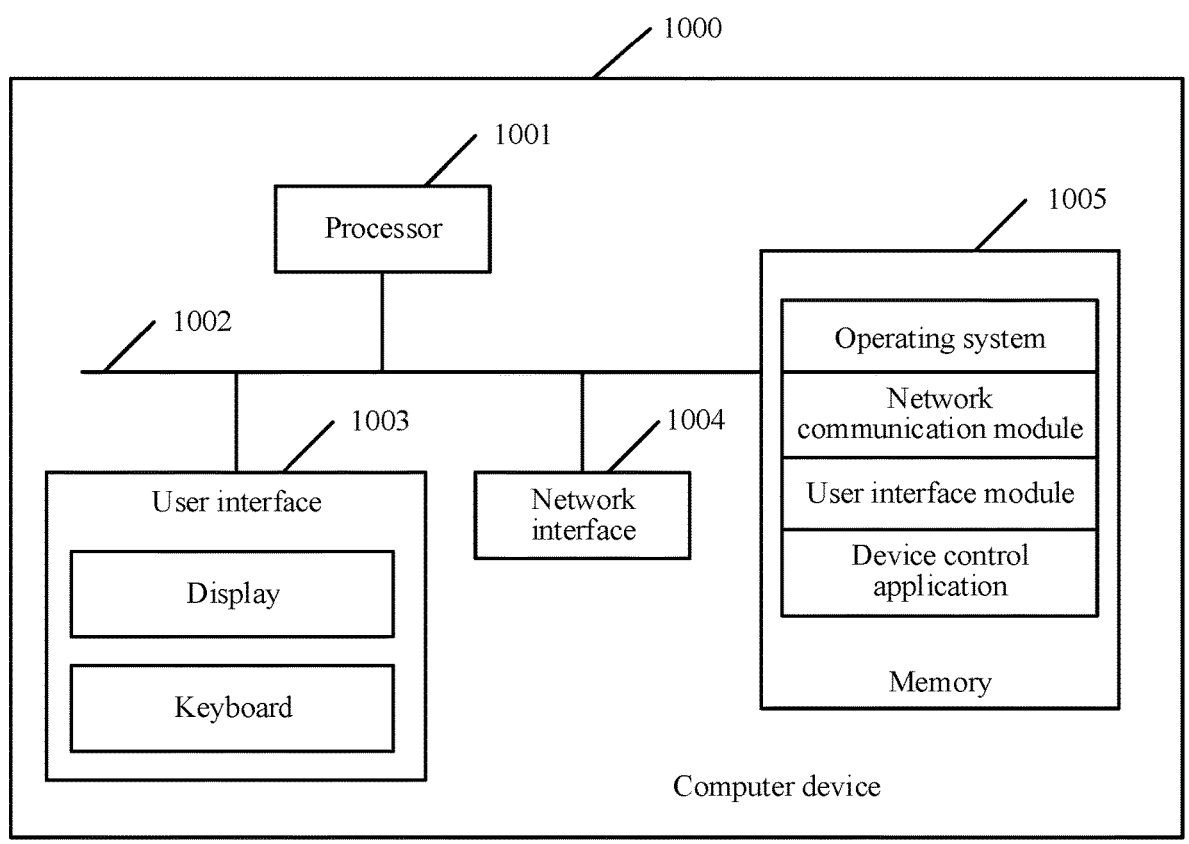
FIG. 10 is a schematic structural diagram of a computer device according to this application.

Referring to FIG. 10, FIG. 10 is a schematic structural diagram of a computer device according to this application. As shown in FIG. 10, the computer device 1000 may include: a processor 1001, a network interface 1004, and a memory 1005. In addition, the computer device 1000 may include: a user interface 1003 and at least one communication bus 1002. The communication bus 1002 is configured to implement connection and communication between the components. The user interface 1003 may include a display, a keyboard, and optionally, the user interface 1003 may further include a standard wired interface and a standard wireless interface. Optionally, the network interface 1004 may include a standard wired interface and a standard wireless interface (such as a Wi-Fi interface). The memory 1005 may be a high-speed random access memory (RAM), or may be a non-volatile memory, for example, at least one magnetic disk memory. Optionally, the memory 1005 may be at least one storage apparatus that is located far away from the foregoing processor 1001. As shown in FIG. 10, the memory 1005 used as a computer storage medium may include an operating system, a network communication module, a user interface module, and a device-control application program.

In the computer device 1000 shown in FIG. 10, the network interface 1004 may provide a network communication function, the user interface 1003 is mainly configured to provide an input interface for a user, and the processor 1001 may be configured to invoke the device-control application stored in the memory 1005, to implement the description of the data coding method in the embodiment corresponding to FIG. 3. It is to be understood that, the computer device 1000 described in this embodiment of this application may also implement the descriptions of the data coding apparatus 1 in the foregoing embodiment corresponding to FIG. 9. Details are not described herein again. In addition, the description of beneficial effects of the same method is not described herein again.

In various embodiments in the present disclosure, a unit (or sub-unit) may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module (or sub-module) may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In addition, it is to be pointed out that, this application further provides a computer-readable storage medium, the computer-readable storage medium storing a computer program executed by the data coding apparatus 1 mentioned above, the computer program including program instructions, the program instructions, when executed by a processor, implementing the description of the data coding method in the foregoing embodiment corresponding to FIG. 3. Therefore, details are not described herein again. In addition, the description of beneficial effects of the same method is not described herein again. For technical details that are not disclosed in the computer storage medium embodiments of this application, reference may be made to the descriptions of the method embodiments of this application.

A person of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may include a magnetic disc, an optical disc, a read-only memory (ROM), a random access memory (RAM), or the like.

The description disclosed above is merely exemplary embodiments of this application, and certainly is not intended to limit the scope of the claims of this application. Therefore, equivalent variations made according to the claims of this application shall fall within the scope of this application.

What is claimed is:

1. A method for encoding video data, comprising:
   acquiring, by a device comprising a memory storing instructions and a processor in communication with the memory, at least two coding units in an image frame in video data;
   acquiring, by the device, motion vector information of each coding unit of the at least two coding units;
   determining, by the device, overall average vector information of the image frame based on the motion vector information of each coding unit;
   determining, by the device, component average vector information of the image frame in a reference direction based on component vector information of the motion vector information of each coding unit in the reference direction;
   determining, by the device, a frame execution policy of the image frame for a motion search operation in the reference direction according to the overall average vector information and the component average vector information, wherein the frame execution policy indicating a frame enable execution policy or a frame disable execution policy, by:
   determining a frame component proportion value according to the overall average vector information and the component average vector information,
   in response to the frame component proportion value being greater than or equal to a first proportion threshold or the frame component proportion value being less than or equal to a second proportion threshold, determining that the frame execution policy of the image frame is the frame enable execution policy, wherein the first proportion threshold is greater than the second proportion threshold, and
   in response to the frame component proportion value being less than the first proportion threshold and greater than the second proportion threshold, determining that the frame execution policy of the image frame is the frame disable execution policy; and
   encoding, by the device, the image frame according to the determined frame execution policy.

2. The method according to claim 1, wherein the determining the overall average vector information of the image frame based on the motion vector information of each coding unit comprises:
   acquiring horizontal component vector information and vertical component vector information in the motion vector information of each coding unit;
   determining a motion vector value corresponding to each coding unit based on the horizontal component vector information and vertical component vector information corresponding to each coding unit; and
   determining the overall average vector information according to the motion vector value corresponding to each coding unit and a unit number of the at least two coding units.

3. The method according to claim 1, wherein:
   the reference direction comprises a horizontal reference direction;
   the component vector information of the motion vector information of each coding unit in the reference direction comprises horizontal component vector information; and
   the determining component average vector information of the image frame in the reference direction based on the component vector information of the motion vector information of each coding unit in the reference direction comprises:
   acquiring the horizontal component vector information of the motion vector information of each coding unit in the horizontal reference direction,
   determining a horizontal component value corresponding to each coding unit according to the horizontal component vector information of each coding unit in the horizontal reference direction, and
   determining the component average vector information according to the horizontal component value corresponding to each coding unit and a unit number of the at least two coding units.

4. The method according to claim 1, wherein:
   the reference direction comprises a vertical reference direction;
   the component vector information of the motion vector information of each coding unit in the reference direction comprises vertical component vector information; and
   the determining component average vector information of the image frame in the reference direction based on the component vector information of the motion vector information of each coding unit in the reference direction comprises:
   acquiring the vertical component vector information of the motion vector information of each coding unit in the vertical reference direction,
   determining a vertical component value corresponding to each coding unit according to the vertical component vector information of each coding unit in the vertical reference direction, and
   determining the component average vector information according to the vertical component value corresponding to each coding unit and a unit number of the at least two coding units.

5. The method according to claim 1, further comprising:
   in response to determining that the frame execution policy of the image frame is the frame enable execution policy, determining a motion vector value and a component vector value of each coding unit according to the motion vector information of each coding unit; and determining a unit execution policy of each coding unit for the motion search operation according to the motion vector value and the component vector value corresponding to each coding unit.

6. The method according to claim 1, wherein the acquiring the motion vector information of each coding unit of the at least two coding units comprises:
   acquiring a reference image frame of the image frame;
   acquiring a predicted image block corresponding to each coding unit from the reference image frame; and
   determining the motion vector information of each coding unit according to a relative shift between each coding unit and the corresponding predicted image block and a target motion vector accuracy.

7. An apparatus for encoding video data, the apparatus comprising:
   a memory storing instructions; and
   a processor in communication with the memory, wherein, when the processor executes the instructions, the processor is configured to cause the apparatus to perform:
      acquiring at least two coding units in an image frame in video data,
      acquiring motion vector information of each coding unit of the at least two coding units,
      determining overall average vector information of the image frame based on the motion vector information of each coding unit,
      determining component average vector information of the image frame in a reference direction based on component vector information of the motion vector information of each coding unit in the reference direction,
      determining a frame execution policy of the image frame for a motion search operation in the reference direction according to the overall average vector information and the component average vector information, wherein the frame execution policy indicating a frame enable execution policy or a frame disable execution policy, by:
         determining a frame component proportion value according to the overall average vector information and the component average vector information,
         in response to the frame component proportion value being greater than or equal to a first proportion threshold or the frame component proportion value being less than or equal to a second proportion threshold, determining that the frame execution policy of the image frame is the frame enable execution policy, wherein the first proportion threshold is greater than the second proportion threshold, and
         in response to the frame component proportion value being less than the first proportion threshold and greater than the second proportion threshold, determining that the frame execution policy of the image frame is the frame disable execution policy, and
      encoding the image frame according to the determined frame execution policy.

8. The apparatus according to claim 7, wherein, when the processor is configured to cause the apparatus to perform determining the overall average vector information of the image frame based on the motion vector information of each coding unit, the processor is configured to cause the apparatus to perform:
   acquiring horizontal component vector information and vertical component vector information in the motion vector information of each coding unit;
   determining a motion vector value corresponding to each coding unit based on the horizontal component vector information and vertical component vector information corresponding to each coding unit; and
   determining the overall average vector information according to the motion vector value corresponding to each coding unit and a unit number of the at least two coding units.

9. The apparatus according to claim 7, wherein:
   the reference direction comprises a horizontal reference direction;
   the component vector information of the motion vector information of each coding unit in the reference direction comprises horizontal component vector information; and
   when the processor is configured to cause the apparatus to perform determining component average vector information of the image frame in the reference direction based on the component vector information of the motion vector information of each coding unit in the reference direction, the processor is configured to cause the apparatus to perform:
      acquiring the horizontal component vector information of the motion vector information of each coding unit in the horizontal reference direction,
      determining a horizontal component value corresponding to each coding unit according to the horizontal component vector information of each coding unit in the horizontal reference direction, and
      determining the component average vector information according to the horizontal component value corresponding to each coding unit and a unit number of the at least two coding units.

10. The apparatus according to claim 7, wherein:
   the reference direction comprises a vertical reference direction;
   the component vector information of the motion vector information of each coding unit in the reference direction comprises vertical component vector information; and
   when the processor is configured to cause the apparatus to perform determining component average vector information of the image frame in the reference direction based on the component vector information of the motion vector information of each coding unit in the reference direction, the processor is configured to cause the apparatus to perform:
      acquiring the vertical component vector information of the motion vector information of each coding unit in the vertical reference direction,
      determining a vertical component value corresponding to each coding unit according to the vertical component vector information of each coding unit in the vertical reference direction, and
      determining the component average vector information according to the vertical component value corresponding to each coding unit and a unit number of the at least two coding units.

11. The apparatus according to claim 7, wherein, when the processor executes the instructions, the processor is configured to further cause the apparatus to perform:
   in response to determining that the frame execution policy of the image frame is the frame enable execution policy, determining a motion vector value and a component vector value of each coding unit according to the motion vector information of each coding unit; and
determining a unit execution policy of each coding unit for the motion search operation according to the motion vector value and the component vector value corresponding to each coding unit.

12. The apparatus according to claim 7, wherein, when the processor is configured to cause the apparatus to perform acquiring the motion vector information of each coding unit of the at least two coding units, the processor is configured to cause the apparatus to perform:
acquiring a reference image frame of the image frame;
acquiring a predicted image block corresponding to each coding unit from the reference image frame; and
determining the motion vector information of each coding unit according to a relative shift between each coding unit and the corresponding predicted image block and a target motion vector accuracy.

13. A non-transitory computer-readable storage medium, storing computer-readable instructions, wherein, the computer-readable instructions, when executed by a processor, are configured to cause the processor to perform:
acquiring at least two coding units in an image frame in video data;
acquiring motion vector information of each coding unit of the at least two coding units;
determining overall average vector information of the image frame based on the motion vector information of each coding unit;
determining component average vector information of the image frame in a reference direction based on component vector information of the motion vector information of each coding unit in the reference direction;
determining a frame execution policy of the image frame for a motion search operation in the reference direction according to the overall average vector information and the component average vector information, wherein the frame execution policy indicating a frame enable execution policy or a frame disable execution policy, by:
determining a frame component proportion value according to the overall average vector information and the component average vector information,
in response to the frame component proportion value being greater than or equal to a first proportion threshold or the frame component proportion value being less than or equal to a second proportion threshold, determining that the frame execution policy of the image frame is the frame enable execution policy, wherein the first proportion threshold is greater than the second proportion threshold, and
in response to the frame component proportion value being less than the first proportion threshold and greater than the second proportion threshold, determining that the frame execution policy of the image frame is the frame disable execution policy; and
encoding the image frame according to the determined frame execution policy.

14. The non-transitory computer-readable storage medium according to claim 13, wherein, when the computer-readable instructions are configured to cause the processor to perform determining the overall average vector information of the image frame based on the motion vector information of each coding unit, the computer-readable instructions are configured to cause the processor to perform:
acquiring horizontal component vector information and vertical component vector information in the motion vector information of each coding unit;
determining a motion vector value corresponding to each coding unit based on the horizontal component vector information and vertical component vector information corresponding to each coding unit; and
determining the overall average vector information according to the motion vector value corresponding to each coding unit and a unit number of the at least two coding units.

15. The non-transitory computer-readable storage medium according to claim 13, wherein:
the reference direction comprises a horizontal reference direction;
the component vector information of the motion vector information of each coding unit in the reference direction comprises horizontal component vector information; and
when the computer-readable instructions are configured to cause the processor to perform determining component average vector information of the image frame in the reference direction based on the component vector information of the motion vector information of each coding unit in the reference direction, the computer-readable instructions are configured to cause the processor to perform:
acquiring the horizontal component vector information of the motion vector information of each coding unit in the horizontal reference direction,
determining a horizontal component value corresponding to each coding unit according to the horizontal component vector information of each coding unit in the horizontal reference direction, and
determining the component average vector information according to the horizontal component value corresponding to each coding unit and a unit number of the at least two coding units.

16. The non-transitory computer-readable storage medium according to claim 13, wherein, when the computer-readable instructions are executed by the processor, the computer-readable instructions are configured to further cause the processor to perform:
in response to determining that the frame execution policy of the image frame is the frame enable execution policy, determining a motion vector value and a component vector value of each coding unit according to the motion vector information of each coding unit; and
determining a unit execution policy of each coding unit for the motion search operation according to the motion vector value and the component vector value corresponding to each coding unit.

17. The non-transitory computer-readable storage medium according to claim 13, wherein, when the computer-readable instructions are configured to cause the processor to perform acquiring the motion vector information of each coding unit of the at least two coding units, the computer-readable instructions are configured to cause the processor to perform:
acquiring a reference image frame of the image frame;
acquiring a predicted image block corresponding to each coding unit from the reference image frame; and
determining the motion vector information of each coding unit according to a relative shift between each coding unit and the corresponding predicted image block and a target motion vector accuracy.

* * * * *